Aug. 31, 1954　　　　　　　　R. BRUNI　　　　　　　　2,687,790
COUPLING DEVICE

Filed June 25, 1948　　　　　　　　　　　　　　6 Sheets-Sheet 4

INVENTOR
RICCARDO BRUNI
By
Young, Emery & Thompson
Att'ys.

INVENTOR
RICCARDO BRUNI
By Young Emery & Thompson
ATTYS.

Patented Aug. 31, 1954

2,687,790

UNITED STATES PATENT OFFICE 2,687,790

COUPLING DEVICE

Riccardo Bruni, Genoa, Italy

Application June 25, 1948, Serial No. 35,259

10 Claims. (Cl. 192—40)

The present invention relates to a coupling device which may be used in many kinds of machines, e. g. calculating machines, switches of automatic telephone systems, remote control plants.

It has for its principal object to provide a coupling device which may be purely mechanical or partly mechanical and partly electrical and which permits one or more driven components to be either coupled to a rotating driving component or stopped in a very short time and in various predetermined relative angular positions.

Other objects of this invention will appear hereinafter as the description of the invention proceeds, the novel features, combinations and constructions being more particularly pointed out in the specification and the claims hereunto appended.

In the accompanying drawings which show examples of performance of the invention, there is only represented what is necessary for making the invention easily understandable, whilst other parts, particularly certain driving means and certain components controlled by the device and varying according to the use to be made of the device, are not shown in order to make the drawings clearer, in which Fig. 5 is a diagrammatic sectional side view of certain essential components of the first embodiment of which Fig. 10 shows the wiring diagram of the embodiment represented in Fig. 1, Figs. 11a, 11b and 11c show diagrammatically certain series of relative positions of the coupling pins and the corresponding positions of certain electrical contact means.

Figure 5:
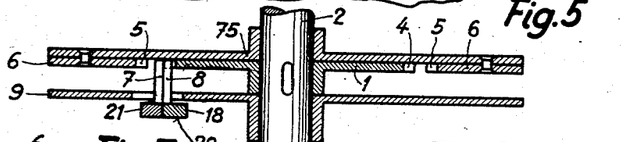
Figure 6:
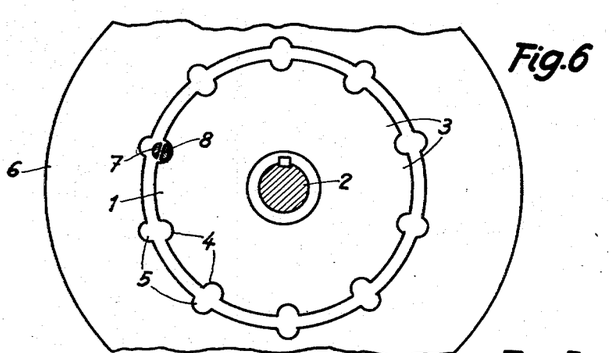
Figs. 6, 7 and 8 are diagrammatic plan views showing certain coupling pins in three different positions, respectively.

Referring now to Figs. 5 and 6, the reference numeral 1 designates a disc which in the present case constitutes the driving part of the coupling device. This disc possesses a central bore by means of which it is mounted and keyed on a driving shaft 2. As the case may be, several coupling devices of the same or of a kind similar to that of the coupling device hereinabove described may be aligned on this driving shaft 2.

Figure 7:
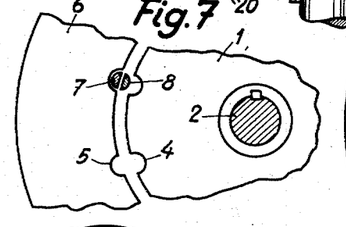
Figure 8:
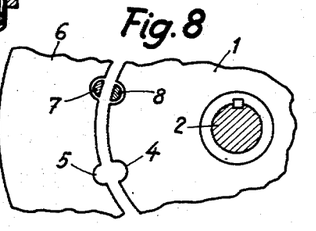

The driving disc 1 possesses at its periphery a plurality of evenly divided teeth 3, the indentations 4 between them corresponding in number and size to indentations 5 provided at the inner circumference of a toothed rim 6 constituting one of the driven components of the coupling device. The coupling together of the driving and the driven component is obtained by means of coupling pins, namely an outside pin 7 and an inside pin 8, both having a flat surface by which they engage each other in certain working positions. Said coupling pins 7 and 8 have a width slightly inferior to that of the indentations 4 and 5. They can take diverse working positions as shown in Figs. 6, 7 and 8. These positions correspond to the coupling of the driving component, say the disc 1, with the driven components, say the toothed rim 6 and a base disc 9. The coupling and uncoupling respectively are obtained by a mechanism supported by said base disc 9 having a central sleeve by means of which it is mounted on the shaft 2 so as to be coaxial to the driving disc 1. So is a disc 75 supporting the toothed rim 6. Hence, both the disc 75 with said rim 6 and the base disc 9 are loosely mounted on the shaft 2. The coupling pins 7 and 8 are moved within a radial recess of the base disc 9.

The mechanism hereabove cited, by means of which the coupling pins 7 and 8 are moved from one of their working positions into another, comprises a loading whip 10 rotatively mounted on a pivot 11 fastened to the base disc 9. Said whip 10 possesses a leg 12 ending in a tip 13. It has also an extension 14 with hooked parts to which are hitched by one of their ends two coil springs 15 and 16. The other end of the first mentioned spring is hitched to a stud 17 fastened to the base disc 9, while the spring 16 is connected with an inside coupling whip 18 rotatively mounted on a pivot 19 also fastened to the base disc 9. The end of this whip 18 which is opposed to that to which the spring 16 is connected, is represented in Fig. 5. A head portion 20 provided on this end of the whip carries the inside coupling pin 8 and projects from the general plan of the element which otherwise is flat. When the parts are in their respective position shown in Fig. 1, the softly loaded spring 16 presses the inside coupling pin 8 against the outside coupling pin 7 rigidly fixed to a protuberance of an outside coupling whip 21. This latter is mounted rotatively on the pivot 19 beside the inside coupling whip 18 and possesses a nose 22 cooperating with a stop 23 provided on a lever armature 24 of an electromagnet 25, a spring 26 having the tendency to hold said armature away from the poles of said electromagnet.

Figures 1, 2, 9:
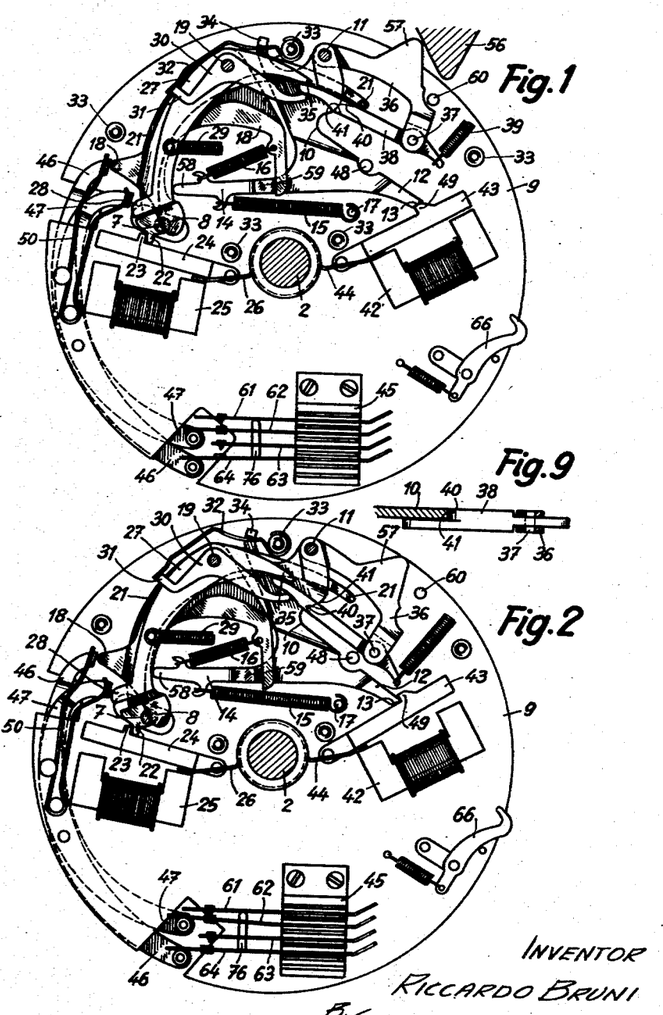
Fig. 1 is a plan view of a first embodiment, the components being shown in one of their relative positions.
Figs. 2, 3 and 4 are similar plan views, the parts being shown in other relative positions, respectively.
Fig. 9 is a part sectional side view of a lever assembly pertaining to the first embodiment.

A further whip 27 likewise mounted rotatively on the pivot 19 possesses at one of its ends a butt 28 which normally abuts by a straight edge against end surfaces of the protuberances both of the inside and outside coupling whips 18 and 20 (Fig. 1).

Also mounted on the pivot 19 is a crank lever 30 upon one arm 31 of which acts a leaf-spring 32 held by a sleeve 33 secured to the base disc 9, said leaf-spring 32 being adapted to be loaded by a hooked portion 34 provided at the upper end of an arm of the loading whip 10.

On the pivot 11 carrying this loading whip 10 is also mounted rotatively a loading arm 36 in one end of which is journalled a pivot 37 for a cam lever 38. This latter extends partly along the loading whip 10 and ends between an arm of the crank lever 30 and an arm 35 of the whip 27. It is held in the position shown in Fig. 1 by the tension of the leaf-spring 32 which then overwhelms a coil spring 39 hitched to the base disc 9. On its back side, the came lever 38 posesses a cam 40 which abuts against a boss 41 of the loading whip 10 when the loading lever is in a position in which it rests on a stop pin 60 fastened to the base disc 9.

Figure 10:
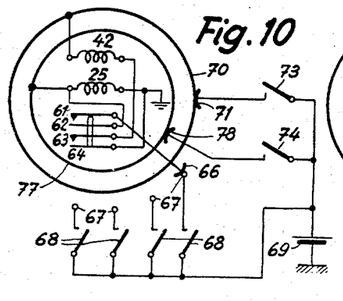

The latter supports also an electromagnet 42 having an armature lever 43 normally held away from the poles of said magnet by a spring 44. Furthermore, a brush 66 is pivotally mounted thereon, and is electrically connected (Fig. 10) to one end of the winding of the electromagnet 25, through contact springs 62 and 61 of a switch likewise secured on the base disc 9 and having further contact springs 63 and 64. When the base disc 9 rotates, said brush 66 runs over a bank of fixed terminals 67 evenly disposed on a circumference concentric to the shaft 2 of a number equal to that of the indentations 4 and 5 of the driving disc 1 and driven rim 6, respectively. Every time that the brush 66 touches one of said terminals 67, said indentations are placed face to face. Said terminals are connected through selecting means, e. g. switches 68, to one pole of a battery 69 having its other pole connected to ground, that is, to the frame of the machine or apparatus to which the coupling device pertains.

Moreover, there is fixed to this base disc 9, by means of screws (not represented) screwed into the threaded holes of the sleeves 33, an insulating cover disc (not represented) carrying a metallic slip ring 70 cooperating with a fixed brush 71 connected by a switch 73 to the battery 69. The slip ring 70 is connected to the one end of the winding of the electromagnet 42, the other end of which is connected to the contact spring 63. This latter cooperates with the contact spring 64 actuated by a lever 46 cooperating with the inside coupling whip 18, while the contact spring 61 with which the contact spring 62 cooperates, is actuated by a lever 47 cooperating with the butt 28 of the whip 27 and connected to ground. Both levers 47 and 46 are pivotally mounted on the base disc 9 and are urged onto their actuating whip by a spring 50.

When the brush 66 is running over a terminal 67 on which the tension of the battery 69 is applied, the electromagnet 25 will be excited provided that ground potential be applied to the contact spring 62 by the contact spring 61. This does not only depend on the position of the lever 47 which makes connection to ground, but also on the position of the lever 46 which afterwards separates the contacts 61, 62 by means of an insulated push-piece 76, on preparing the circuit of the electromagnet 42 by pressing the contact springs 63, 64 onto each other. With the lever 46 in the last mentioned position, the electromagnet 42 may be excited by closing the switch 73, whatever the position and the running condition of the base plate 9 may be.

Preferably, the end of the winding of the electromagnet 25 connected to the contact spring 62 is also connected to a slip ring 77 similar to the slip ring 70. A fixed brush 78 cooperating with said slip ring 77 would likewise be connected through a switch 74 to the battery 69.

The hereabove described coupling device works as follows:

In the relative position of the parts shown in Fig. 1, the leg 12 of the loading whip 10 abuts against the stop pin 48 and the tip 13 is placed over the stop 49 of the armature lever 43. The nose 22 of the outside coupling whip 21 being held by the stop 23, the coupling pins 7 and 8 are rested against each other and placed in one of the indentations 4 of the driving disc 1 (Figs. 1 and 6). Hence, when the latter rotates, it will drive the base disc 9 alone; the latter, in turn carries a boss 57 provided on the loading arm 36 before a cam 56 rigidly fixed (in a manner not shown) to the frame of the apparatus to which the device pertains. The first encounter of the elements 36 and 56 effects the loading of the mechanism in the following way: The loading arm 36 rocking on its pivot 11, the cam 40 of the cam lever 38 presses upon the boss 41 of the loading whip 10 and swings it clockwise (Fig. 1) until the tip 13 has overrun the stop 49 and permits the spring 44 to swing the armature lever 43 counterclockwise until it arrives in the position shown in Fig. 2.

The loading whip 10 swinging, the end 58 of its extension 14 presses upon the whip 27 and separates the butt 28 from the heads of the coupling whips 18 and 21, in order to permit them to be moved subsequently. On whipping of the whip 27, the arm 35 thereof acts upon the cam lever 38 which is thus brought into the position shown in Fig. 2. Moreover, the butt 28 acts upon the lever 47 and in so doing, closes the contacts 61, 62. Hence, the circuit of the electromagnet 25 is ready to be closed as soon as the brush 66 will meet the terminal 67 to which the tension of the battery 69 is applied. When this occurs, the armature lever 24 is attracted and its stop 23 frees the nose 22. Due to the action of the coil spring 16, the inside coupling whip 18 then acts through the inside coupling pin 8 upon the outside coupling pin 7, so that the head 20 of the inside coupling whip 18 will strike against the straight edge of the butt 28. On rocking of the outside coupling whip 21, an arm thereof presses down the cam lever 38, the pivot 37 of which is in the meantime returned into its outside normal position together with the loading lever 36. While the cam lever 38 comes into the position shown in Fig. 3, one of its arms acts upon the crank lever 30 and tensions the leaf spring 32. As soon as the outside coupling whip 21 swings counterclockwise (Figs. 3 and 4), the last mentioned spring will bring the cam lever 38 back into the position shown in Fig. 1. But as long as this cam lever 38 occupies the position of Figs. 3 and 4, the periodic passages of the boss 57 over the cam 56 do not affect the position of the loading whip 10, though the loading arm 36 is operated upon at each of these passages. Indeed, the cam 40 of the cam lever 38 is displaced in a recess of the loading whip 10 and therefore it does not act upon the boss 41 thereof.

Figure 3:
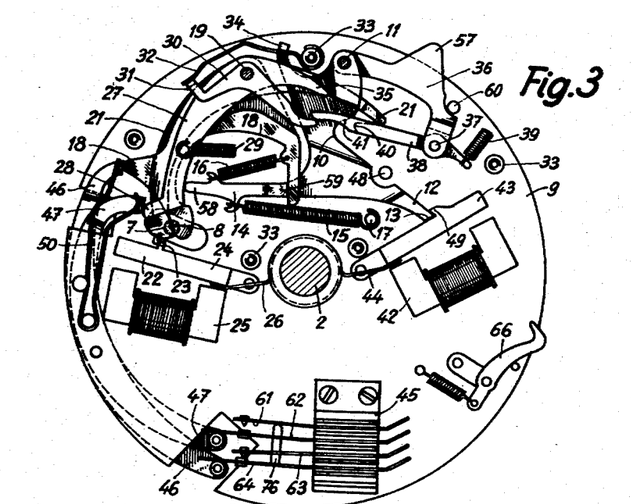

When the parts of the device occupy their relative position shown in Fig. 3, the coupling pins 7 and 8 are in the position shown in Fig. 7. Hence, the driving disc has been uncoupled from the base disc and rotates alone, while said base disc 9 is coupled to toothed rim 6 secured to the disc 75 (Fig. 5) loosely mounted on the shaft 2. To prevent drawing along of these driven components 6, 75 and 9 on account of friction between them and the said shaft 2, there may be provided resilient exterior blocking means engaging (not represented) notches at the outer periphery of said toothed rim 6 and driven disc 75.

Figure 4:
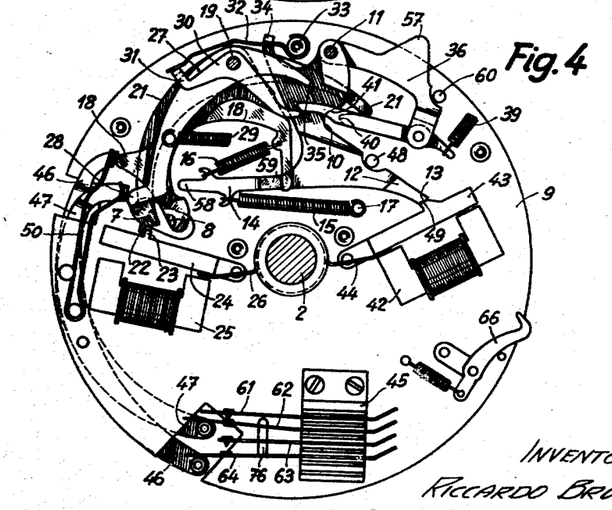

When swinging clockwise, the inside coupling whip 18 had pressed by means of a boss thereof upon one end of the lever 46, the other end of which then had closed the contacts 63, 64 and by means of the insulated push-piece 76 separated the contacts 61, 62 and therefore broken off the circuit of the electromagnet 25. On closing the switch 73, the circuit of the electromagnet 42 is traced as follows: battery 69, switch 73, brush 71, slip ring 70, winding of the said electromagnet, contacts 63, 64 to ground. The armature lever 43 is attracted and the spring 15 is then permitted to bring the loading whip 10 into the position shown in Fig. 4. When swinging counterclockwise, the last mentioned whip acts by means of a projection 59 upon the inside coupling whip 18. This motion results both in separating the coupling pins 7 and 8 from each other and in coupling to the driving disc 1 the driven disc 75 as well as the base disc 9. Moreover, the swinging of the inside coupling whip 18 also results in rocking the lever 46 in clockwise direction, (Fig. 4) and consequently in breaking off the circuit of the electromagnet 42 and closing again the contacts 61, 62 which control the circuit of the electromagnet 25. The last mentioned relative position of the parts is shown in Fig. 4.

On a further contact of the brush 66 with a terminal 67 to which is applied the potential of the battery 69, the above mentioned circuit of the electromagnet 25 is closed again, the armature lever 24 is attracted and its stop 23 leaving the nose 22 permits the outside coupling whip 21 to return into the position shown in Fig. 1, where the base plate 9 is coupled to the driving disc 1. The cam lever 38 once again is ready to act by its cam 40 upon the boss 41 of the loading whip 10 as soon as the boss 57 of the loading arm 36 runs over the cam 56 to initiate a new cycle of operations, the diverse steps of which will take place as described hereabove.

Figure 11A:
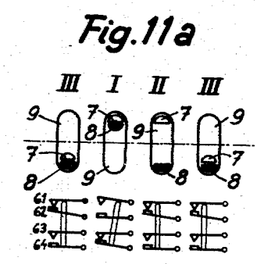
Figure 11B:
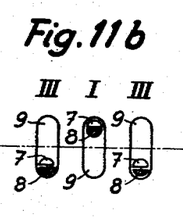

During the function, the sequence of the positions of the coupling pins 7 and 8 has been: III, loading, I, II, III; this sequence has been represented in Fig. 11a in connection with the corresponding working positions of the spring contacts 61, 62, 63 and 64. In most practical applications, the position I will be the initial or rest position. Yet, it can be necessary to avoid the position II and to pass directly from the position I into the position III, as shown in Fig. 11b. To this end, I have provided for the slip ring 77 connected to the winding of the electromagnet 25, the fixed brush 78, the switch 74 and wiring as described herein above. Even in position I, in which the contacts 61, 62 are broken off, the electromagnet 25 may then be excited by closing the switch 74, as may clearly be seen. If in the same time the switch 73 is equally closed, both the electromagnets 25 and 42 will be excited. This will cause the spring 29 to act immediately upon the whip 27 and the projection 59 of the loading whip 10 to act simultaneously upon the inside coupling whip 18 with the result that both coupling pins are moved simultaneously from position I into position III.

Figure 11C:
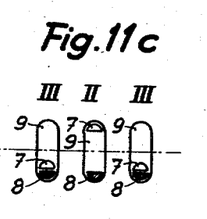
Figures 12, 16, 17:
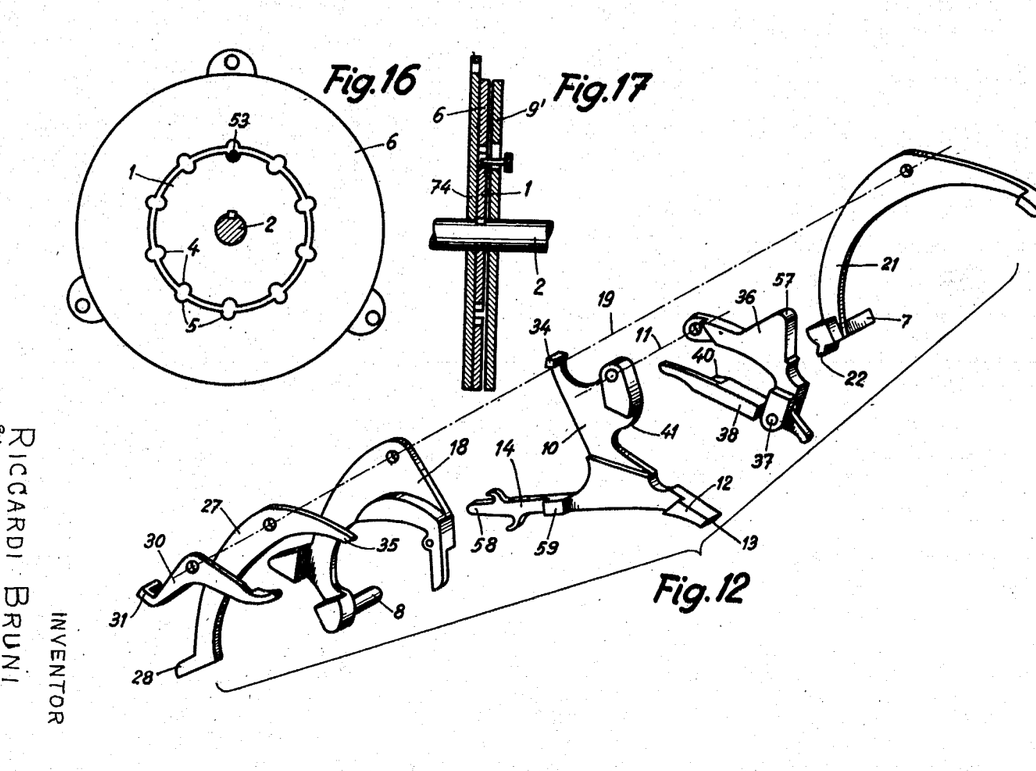
Fig. 12 is an exploded perspective view of a portion of the first embodiment, showing certain parts in the positions which they occupy in Fig. 1.
Fig. 16 is a diagrammatic plan view showing the relation between the driving and driven parts.
Fig. 17 is a sectional view of the structure shown in Fig. 16.

It will be easily understood that by means of other combinations of electrical switch and contact means and of levers such as for example 46 and 47, it would be easy to obtain a coupling device permitting to pass from position III into position II and back into position III without having the components remaining in the position I. Such a sequence of working positions of the coupling pins is shown in Fig. 11c.

Reference will now be made to Figs. 13 to 18, which represent a second embodiment of the device according to the invention. This second embodiment distinguishes itself mainly from the first embodiment described hereabove, by the fact that it has one single coupling pin 53 fixed to a coupling whip 18' corresponding to the member 18 of Figs. 1 to 4. Consequently, this second embodiment does not present all the possibilities of coupling of the preceding embodiment.

Figure 13:
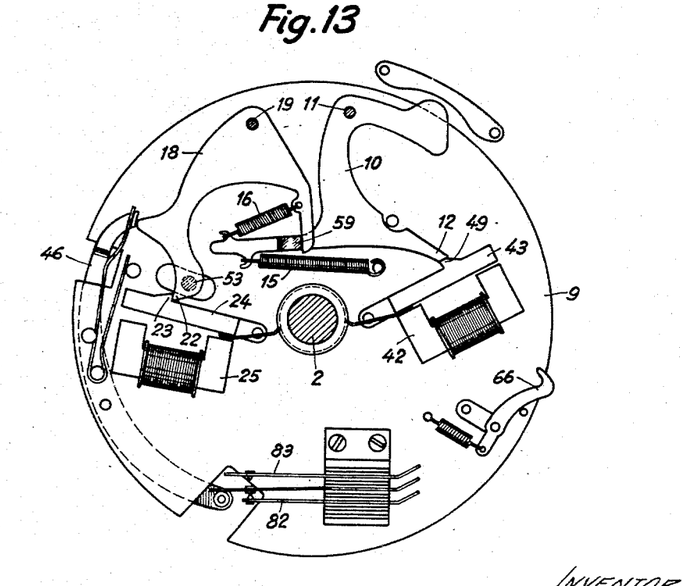
Fig. 13 is a plan view of a second embodiment.
Figure 14:
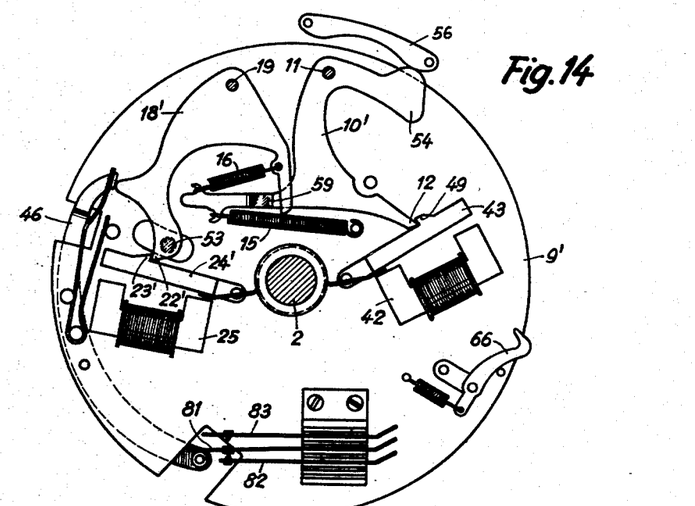
Figs. 14 and 15 are similar plan views with the parts being shown in different positions.
Figure 15:
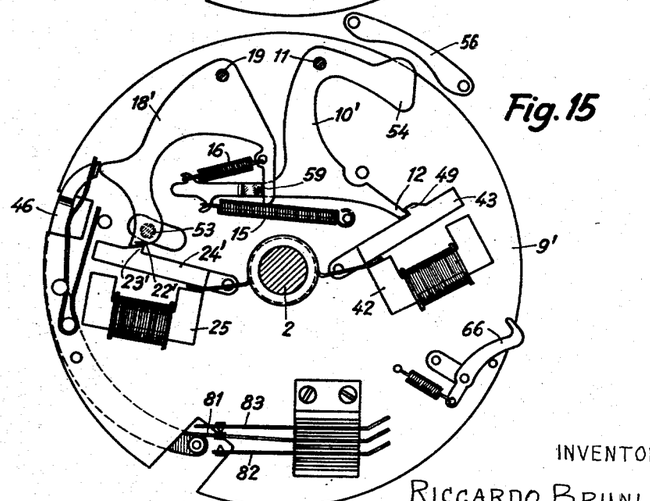

In Figs. 13 to 15, a loading whip is shown at 10' and is pivotally mounted on pivot 11. Coupling whip 18' turns around the axle 19; the electromagnets 25 and 42 with their respective armatures 24 and 43 and lever 46 are the same as in Figs. 1 to 4. Lever 46 controls a movable contact 81 adapted to cooperate alternatively with either one of two fixed contacts 82, 83.

Figure 18:
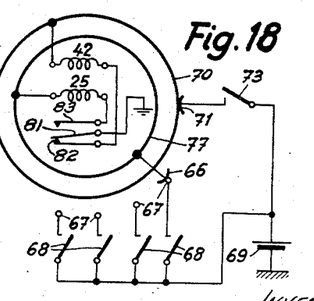
Fig. 18 is a wiring diagram of the second embodiment.

Referring to Fig. 18, it can be seen that the winding of electromagnet 25 is again connected to a brush 66 cooperating with contacts 67, which may be connected to the source of current 69 through switches 68.

Here too, there is placed an exterior thrust 56 at the periphery of the device, but this thrust acts directly upon the loading whip 10' which possesses to this end an arm 54.

In the position shown in Fig. 13, the device is not loaded. Pin 53 is located in an indentation 4 of the driving part 1 (see Figs. 16 and 17). The base disc is shown at 9'. As the base disc of the first embodiment, it supports all components of the coupling mechanism. During its rotation over a certain angle, arm 54 meets the thrust 56 and consequently the leg 12 of whip 10' slides over the stop 49 of the armature 43 of an electromagnet 42. Loading whip 10' is then held in the position of Fig. 14. In this position, the springs 15 and 16 are tensioned and the stop 59 provided on whip 10' is located at a distance from the interior end or leg of coupling whip 18'. The nose 22' of this whip 18' presses then against the stop 23' of the armature 24', so that when electromagnet 25 receives current from the brush 66 through the contact 82 which occupies its closed position, the armature 24' is attracted and spring 16 can bring the whip 18' into the position of Fig. 15. The coupling pin 53 has then passed from one of the indentations of disc 1, which is the driving part, into one of the indentations of disc 6 rigidly connected to part 75' which in this embodiment is a fixed part. The base disc 9' is consequently stopped in the position it occupied when the electromagnet 24' was excited.

When the electromagnet 42 is excited by means of a circuit including a slip ring 70 connected to the winding of the electromagnet 42 and set under current by means of a switch 73, its armature is attracted. The loading whip 10' is consequently disengaged, then rocked senestrorsum by spring 15. Its stop 59 acts on the coupling whip 18' and rocks it senestrorsum. Whip 18' slides over the stop 23' and the pin 53 fixed to it engages one of the indentations of the driven part 1. The rotary movement of the latter is then transmitted to the base disc 9'.

In Fig. 18 there is shown the wiring diagram of this second embodiment. It becomes obvious from this figure that brush 66 can come into contact successively with the terminals 67 of the different switches 68. When the brush 66 finds the terminal of the closed switch 68, electromagnet 25 is energized through the following circuit: source of current 69, closed switch 68, terminal 67, brush 66, winding of the electromagnet 25, closed contacts 83, 81, to ground. The base disc 9 is now at rest in a position which depends on which one of the switches 67 has been closed. Meanwhile contact 81 has been brought into engagement with contact 82 by means of the lever 46 and of the coupling whip 18'. Thus, a circuit is closed which runs from the source 69 through switch 73, slip ring 70, winding of electromagnet 42, contacts 82, 81, to ground. The corresponding mechanical operation has already been described.

While I have described and illustrated some embodiments of my invention, I do not wish to unnecessarily limit the scope of this invention, but reserve the right to make such modifications and rearrangements of the several parts as may come within the purview of the accompanying claims.

What I claim is:

1. Coupling device comprising a rotary driving component, at least one driven component coaxial to the driving component, all but one of the components having peripherical indentations, at least one coupling pin carried by the one component devoid of indentations, and means for engaging at least one coupling pin into and disengaging it from one of the indentations, said means including a stationary loader element, a loading device carried by the component free of indentations, springs associated with said loading device and periodically loaded by said loader element through said loading device upon rotation of said component free of indentations, and control means for unloading in predetermined degrees said spring in order to disengage the coupling at predetermined angular positions of the components with regard to one another.

2. A coupling device comprising a rotary driving component two driven components coaxial with the driving component said driving component and one of said driven components having cooperating peripheral indentations on facing inner and outer peripheries thereof respectively, the other of said driven components being devoid of indentations, two coupling pins carried by the component devoid of indentations, the component carrying said coupling pins having substantially radial recess in which the coupling pins are arranged to move either simultaneously to effect at one time coupling of one of the driven components with the driving components, at another time the coupling of both driven components to each other, and independently from each other to effect coupling of both driven components to the driving component.

3. A coupling device comprising a rotary driving component, two driven components coaxial with the driving component, said driving component and one of said driven components having cooperating peripheral indentations on facing inner and outer peripheries thereof respectively, the other of said driven components being devoid of indentations, an inside coupling pin and an outside coupling pin carried by the component devoid of indentations, the component carrying said coupling pins having a substantially radial recess in which the coupling pins are arranged to move either simultaneously to effect at one time coupling of one of the driven components with the driving components, at another time the coupling of both driven components to each other, and independently from each other to effect coupling of both driven components to the driving component, and means for shifting the coupling pins into and out of engagement with the indentations, said means including a stationary loader element, a loading device carried by the component free of indentations, springs associated with said loading device and periodically loaded by said loader element through said loading device upon rotation of said component free of indentations, and control means for unloading in predetermined degrees said springs in order to change the working state of the coupling device at predetermined angular positions of the components.

4. Coupling device according to claim 3, the loading device comprising a loading arm, a loading whip and a cam lever through which said loading arm acts upon said loading whip when being acted upon itself by said stationary loader element, the coupling device comprising furthermore an outside coupling whip to which the outside coupling pin is rigidly fixed and a whip moved by the loading whip during loading and acting then upon said cam lever to make it inoperative, this cam lever being held inoperative by an arm of said outside coupling whip until both coupling pins are put back into the position which they occupied before said loading arm acted upon said loading whip.

5. Coupling device according to claim 3, the loading device comprising a loading arm, a loading whip and a cam lever through which said loading arm acts upon said loading whip when being acted upon itself by said stationary loader element, the coupling device comprising furthermore an outside coupling whip to which the outside coupling pin is rigidly fixed, a whip moved by the loading whip during loading and acting then upon said cam lever to make it inoperative, this cam lever being held inoperative by an arm of said coupling whip until both coupling pins are put back into the position which they occupied before said loading arm acted upon said loading whip, and a spring-loaded crank lever for putting back said cam lever back into its initial position as soon as permitted by said outside coupling whip.

6. Coupling device comprising a rotary driving component, a first and a second driven component both coaxial to the driving component, the latter and the second driven component having indentations on facing inner and outer peripheries thereof, respectively, the first driven component having a substantially radial recess, an inside and an outside coupling whip both pivotally mounted on said first driven component and made with an inside and an outside coupling pin, respectively, arranged in said recess and adapted to engage said indentations, a stationary loader element, a loading device carried by said first driven component, springs periodically loaded by said loader element through said loading device including a loading whip pivotally mounted on said first driven component, a further whip pivotally mounted on said first driven component about the same center as said coupling whips both having embossments adapted for cooperation with said further whip, said loading whip having an embossment adapted for cooperation with said inside coupling whip, a first of said springs interconnecting said first driven component and said loading whip having an embossment and a first tip adapted for cooperation with said inside coupling whip and with said further whip, respectively, a second and a third of said springs connecting said inside coupling whip with said loading whip and with said further whip, respectively, said loading whip having furthermore a second tip and said outside coupling whip a nose, a first and a second stop movably mounted on said first driven component and adapted for cooperation with said nose and second tip, respectively, control means for controlling said first and second stop independently of each other, a loading operation resulting in said loading whip being rocked against said first spring such as to fall with its second tip behind said second stop, to leave with its embossment the inside coupling whip and to rock with its first tip said further whip against the action of said third spring to clear it from the embossments of said coupling whips held in place by said first stop engaging the nose of the outside coupling whip, with both coupling pins engaging one of the indentations of the driving component, thereby coupling the latter with the first driven component, a consecutive momentary actuation of said first stop permitting said second spring to rock the inside coupling whip, together with the outside coupling whip, into a position in which it is once more pressed against the embossment of the loading whip, the nose of said outside coupling whip engaged by said first stop and both coupling pins disengaged from said indentation of the driving component, a consecutive momentary actuation of said second stop permitting said first spring to rock the loading whip, and through the embossment thereof, the inside coupling whip together with the inside coupling pin back into their initial positions against the action of said third spring, whereby the first driven component and through it the second driven component are coupled to the driving component, and a consecutive second actuation of the first stop permitting the third spring to rock back the said further whip and therethrough the outside coupling whip with its outside coupling pin into their initial positions, whereby said second driven component is uncoupled and the whole device restored so as to be able to begin a new cycle of operations.

7. Coupling device according to claim 6, said control means including a first and a second electromagnet both carried by said first driven component and the armatures of which are provided with said first and second stop, respectively, and circuit means for energizing said electromagnets, including a brush carried by said first driven component, furthermore, in cooperation therewith, a bank of fixed terminals, and means for selectively applying an electrical potential to one of said terminals.

8. Coupling device according to claim 6, said control means including a first and a second electromagnet both carried by said first driven component and the armatures of which are provided with said first and second stop, respectively, and circuit means for momentarily energizing said electromagnets, including a battery and, in the circuit of the first electromagnet, a set of arbitrary operable stationary switch means connected in parallel, a bank of terminals individually connected each to one of said switch means, a brush adapted for cooperation with said bank of terminals and carried by the first driven component, and a pair of contacts also carried by the first driven component and controlled by the said further whip and said inside coupling whip so as to be closed after loading and after actuation of said second stop and opened after each actuation of said first stop, and in the circuit of said second electromagnet, an arbitrary operable stationary switch, a fixed brush, in cooperation therewith a slip ring fixed on said first driven component and a second pair of contacts also carried by said first driven component and controlled by said inside coupling whip so as to be closed from the first actuation of the first stop to the consecutive actuation of the second stop.

9. Coupling device according to claim 6, said control means including a first and a second electromagnet both carried by said first driven component and the armatures of which are provided with said first and second stop, respectively, and circuit means for momentarily energizing said electromagnets, including a battery and, in the circuit of the first electromagnet, two branches connected in parallel, the first of which includes a set of arbitrary operable stationary switch means connected in parallel, a bank of terminals individually connected each to one of said switch means, a brush carried by the first driven component and adapted for cooperation with said bank of terminals, and a first pair of contacts also carried by the first driven component and controlled by the said further whip and said inside coupling whip so as to be closed after loading and after actuation of said second stop and opened after each actuation of said first stop, the second of said branches including a first arbitrary operable stationary switch, a first fixed brush and, in cooperation therewith, a first slip ring, fixed on the first driven component, and in the circuit of said second electromagnet, a second arbitrary operable switch, a second fixed brush, in cooperation therewith a second slip ring fixed on said first driven component and a second pair of contacts also carried by said first driven component and controlled by said inside coupling whip so as to be closed from the first actuation of the first stop to the consecutive actuation of the second stop.

10. Coupling device comprising a rotary driving component having indentations at its periphery, a driven component being coaxial to said driving component and having a substantially radial recess, a coupling whip pivotally mounted on said driven component and made with a nose and with a coupling pin adapted to be moved in said recess and engaged into and disengaged from one of said indentations, a loading whip also pivotally mounted on said driven component, connected by a first spring to the latter and by a second spring to the coupling whip, made with an embossment cooperating with said coupling whip, with a tip and a boss, two stops movably mounted on said driven component, the first of which is adapted for cooperation with said nose and the second for cooperation with said tip, a stationary loader element adapted to cooperate with said boss to rock the loading whip against the action of said two springs and have the tip thereof fall behind said second stop and the embossment thereof move away from the coupling whip, a consecutive actuation of said first stop permitting said second spring to rock the coupling whip against said embossment, thereby disengaging the coupling pin from the driving component, and a consecutive actuation of the second stop permitting the first spring to restore the initial working state, in which said coupling pin engages one of said indentations, and means for controlling the actuations of said stops.

References Cited in the file of this patent

UNITED STATES PATENTS

| Number | Name | Date |
|---|---|---|
| 1,210,969 | Niedergesaess | Jan. 2, 1917 |
| 1,950,485 | Daly | Mar. 13, 1934 |
| 1,950,700 | Simmen | Mar. 13, 1934 |
| 1,997,682 | Emery | Apr. 16, 1935 |
| 2,060,645 | Suppiger et al. | Nov. 10, 1936 |
| 2,161,563 | Doty et al. | June 6, 1939 |
| 2,200,851 | Osborne | May 14, 1940 |
| 2,292,544 | Pfeiffer | Aug. 11, 1942 |

FOREIGN PATENTS

| Number | Country | Date |
|---|---|---|
| 653,341 | Germany | Nov. 20, 1937 |